Patented Oct. 5, 1954

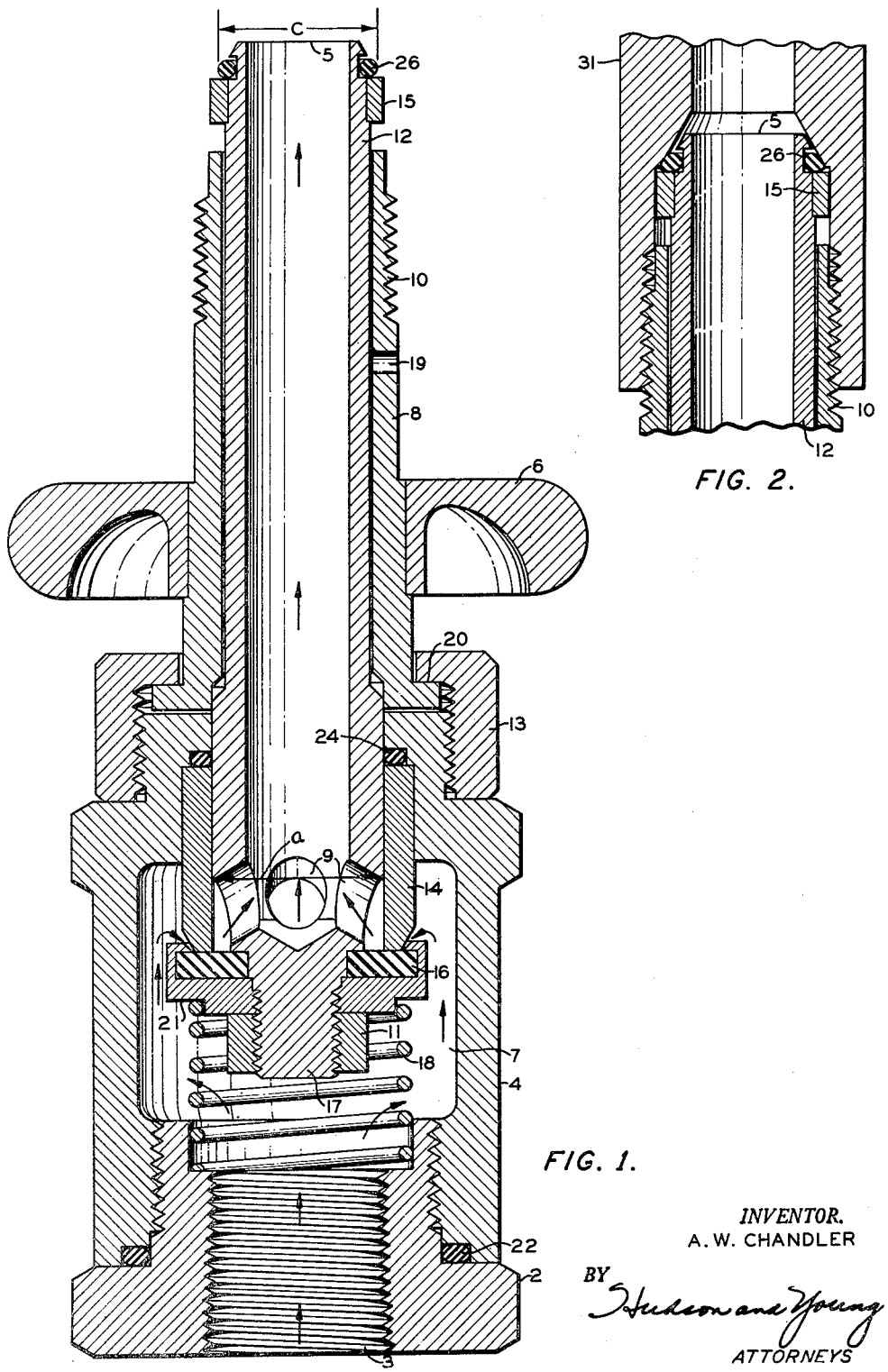

2,690,917

UNITED STATES PATENT OFFICE 2,690,917

COMBINATION HOSE CONNECTOR AND VALVE

Alanson W. Chandler, Tulsa, Okla., assignor to Phillips Petroleum Company, a corporation of Delaware Application August 21, 1950, Serial No. 180,665

2 Claims. (Cl. 284—18)

This invention relates to improvements in a combined hose connector and valve.

In the prior art difficulty has been experienced in providing a hose connector with an automatically opening valve which will operate without leakage over long periods of time, is light and easily handled, is hand operated, and which is rugged of use and economical to manufacture. My invention may be summarized as a hand operable combination hose connector and valve comprising a connector housing, a tubular valve slidably operating inside said housing and protected by said housing such that said tubular valve is automatically opened or closed as the housing is connected or disconnected, said tubular valve having spaced packing elements of different sizes so that hydrostatic pressure in said connector housing tends to extrude said tubular valve into contact with the conduit to which the connector is connected, to maintain a fluid tight seal until disconnection is complete.

An object of this invention is to provide a device for filling containers which includes in a single unit a hose connection and a valve whereby the valve is opened or closed as the supply hose is connected to or disconnected from the container.

Another object is to provide a hose connector containing an automatic valve in which a rugged and relatively simple connection sleeve surrounds and protects, but is separate from the valve so that the control of fluid flow and sealing against leakage is done by mechanism separate from and protected by the mechanism used for making the mechanical connection of the hose portions.

Another object is to provide a new and novel means of operating the valve in said device.

Still another object is to reduce the time required for the filling of liquefied petroleum gas cylinders.

Other objects will be apparent to one skilled in the art upon reading the accompanying specification, claims, and drawings.

Figure 1 is a cross-sectional view of a hose connection embodying the present invention.

Figure 2 is a cross-sectional view, with parts broken away, of a portion of the hose connection of Figure 1 when connected with its complementary fitting.

One preferred form of my invention is indicated in the attached drawing. In Figure 1, the unit comprises housing 4, connecting bushing 8 and tubular valve member 12. Tubular valve member 12 is a floating member and is guided by connecting bushing 8 and valve seat 14. Housing 4 forms conduit 7 which is filled with fluid as indicated by arrows in the drawing when the supply hose is connected at 3 by adapter 2. Leakage between housing 4 and adapter 2 is prevented by O ring 22 or other suitable means. Valve seat 14 is preferably pressed into housing 4 using oil and white lead or other suitable material to insure a leak-proof fit.

O ring 26 is secured to the open end 5 of tubular valve member 12 by retainer washer 15. Valve disc 16 is mounted on backing member 21 and secured to stem 17 of valve member 12 by nut 11. Valve member 12 is held in the closed position by a combination of the action of spring 18, which is under compression, and the pressure of the confined fluid. When the valve is open, fluid enters tubular valve member 12 from conduit 7 through angular perforations 9. O ring 24 prevents leakage between valve member 12 and housing 4 when the valve is in open position or whenever fluid under pressure is in the chamber of tubular valve member 12.

Connecting bushing 8 is provided with a hand wheel 6 and left-hand threads 10. The point of contact 20 between connecting bushing 8 and collar 13 may be lubricated with graphite powder and water or other suitable lubricant. Vent 19 is provided to reduce blow-back between valve member 12 and connecting bushing 8 when the unit is disconnected.

In Figure 2, 31 is the receiver for the container (not shown) being filled, which receiver is threaded to engage threads 10 of bushing 8 and O ring 26 of valve member 12, as shown.

In the operation of my invention, for example, filling a liquid petroleum gas cylinder, the unit is connected to the cylinder to be filled by engaging the threads 10 on bushing 8 with threaded receiver 31 on the cylinder and turning wheel 6. The threads are telescoped until O ring 26 makes a seal with the seat in the cylinder receiver 31 thus preventing leakage between valve member 12 and the cylinder to be filled. Continued turning of hand wheel 6 forces connecting bushing 8 further into receiver 31. Housing 4 is carried forward by the action of the connecting bushing 8 on collar 13. Since valve member 12 cannot move because of the seal between O ring 26 and receiver 31, as housing 4 is carried forward valve seat 14 is separated from valve disc 16 and the fluid in conduit 7 flows between valve seat 14 and valve disc 16 through perforations 9 into tubular valve member 12 and thence through receiver 31 into the cylinder when the valve (not shown) on cylinder receiver 31 is opened.

When the cylinder is full, hand wheel 6 is turned so that connecting bushing 8 is disengaged from receiver 31. As the bushing moves out, the combined action of spring 18 and fluid pressure in conduit 7 returns valve seat 14 to valve disc 16 and a seal is made. Continued turning of the hand wheel disengages the connecting bushing 8 and the seal between O ring 26 and receiver 31 is broken.

One feature of my invention is the relationship between cross-sectional area $c$ at O ring 26 and the cross-sectional area $a$ at O ring 24. As illustrated in Figure 1, the area at $a$ is larger than the area at $c$. Since the pressure exerted on both areas is the same, the result is that the force exerted at $a$ tending to hold the seal between reeciver 31 and O ring 26 is greater than the force exerted at $c$ tending to break the seal between receiver 31 and O ring 26. Thus a seal is effected until the threads 10 are disengaged from receiver 31. It will be noted that air pressure exists in the interspace between the bushing 8 and stem 12. Gasket 26 seals the stem 12 and connector 31 along a circular region normal to the stem and adjacent the protruding end of the stem while gasket 24 seals the stem and housing 4 along a circumferential region normal to the stem and adjacent the inner end thereof. It will be evident that liquefied petroleum gas pressure exists within the connector 31 and within the portion of housing 4 below gasket 24, and that a differential pressure exists tending to force the stem upwardly, i. e., out of the bushing 8 thus tending to close the valve. This force is exerted, as shown, upon the lower flange of the stem 12 along an annular area, the outer boundary of which is defined by projection of gasket 24 and the inner boundary of which is defined by the projection of gasket 26 upon the flange or enlarged lower end of the stem. The force is, of course, equal to the difference in pressure between the liquefied petroleum gas and air multiplied by the annular area just defined.

Another feature of my invention is the utilization of both fluid pressure in conduit 7 and force of spring 18 to insure proper seating of valve disc 16 on valve seat 14. Since the area exposed to the fluid pressure tending to make a seal between the valve disc 16 and valve seat 14 is greater than the area exposed tending to break the seal, the spring 18 need only be strong enough to establish a seal before fluid is introduced into conduit 7.

Another feature of my invention is the drilling of perforations 9 in valve member 12 at an angle. When the perforations are drilled at right angles with respect to valve member 12, turbulence caused by the mixing of the entering fluid streams causes a large pressure drop at this point. In my invention, the perforations are drilled at an angle creating a streamlined effect where the fluid streams join and thereby the pressure drop at this point is reduced.

It is apparent that changes in the details of construction can be effected without departing from the novel subject matter herein disclosed. I do not, therefore, desire to be limited to the single embodiment used for purposes of illustration, but rather by the claims granted me.

I claim:

1. A combination hose connector and valve comprising, in combination, an elongated generally cylindrical housing, means for securing a container for fluid to one end of said housing, a valve seat formed in said housing, a valve head, a spring having one end thereof secured at said one end of the housing and having its other end secured to said valve head to urge it into engagement with the valve seat, an enlarged cylindrical stem secured to said valve head and protruding from the other end of said housing, a metal bushing concentric with and encircling said stem and connected to said housing, a tubular connector secured to said bushing and having an interior chamber, one end of said stem protruding from said bushing and being received within said chamber, a gasket secured to said protruding end of the stem and engageable with the walls of the chamber to define a fluid-tight connection therewith, said one end of the stem having a porion exposed to the fluid pressure within said housing, means for sealing the region between said housing and a portion of said stem received within the housing, said bushing having a vent formed therein communicating with the space between said bushing and said stem at a region between the housing and the threaded end of the bushing, said stem having a cross-sectional area exposed to fluid pressure adjacent the valve head greater than said portion exposed to fluid pressure at the end thereof protruding beyond said bushing, whereby the differential pressure provides a force auxiliary to the force of said spring tending to close said valve.

2. A combination hose connector and valve constructed in accordance with claim 1 including a bearing formed on said housing receiving one end of said bushing, said bearing allowing rotary movement of the stem and housing but preventing longitudinal movement of the bushing relative to the housing, said connector being threadedly connected to the protruding end of said bushing whereby rotation of the bushing in one direction first causes the gasket to engage the chamber walls and thereafter produces relative movement between the housing and stem to effect opening of the valve and rotation of the bushing in the opposite direction first permits closure of the valve and then disengages the gasket from the chamber walls.

References Cited in the file of this patent

UNITED STATES PATENTS

| Number | Name | Date |
|---|---|---|
| 1,278,300 | Brooks | Sept. 10, 1918 |
| 1,471,427 | Towle | Oct. 23, 1923 |
| 1,873,304 | De Mooy | Aug. 23, 1932 |
| 2,138,940 | Robinson | Dec. 6, 1938 |
| 2,361,866 | Norway | Oct. 31, 1944 |
| 2,449,938 | Hansen | Sept. 21, 1948 |
| 2,459,477 | Van Schuyver | Jan. 18, 1949 |